June 22, 1965    M. F. PEDEN, JR    3,190,755
PROCESS FOR PREPARING A SNACK PRODUCT WITH A RIPPLED SURFACE
Filed July 26, 1963
FIG. 1
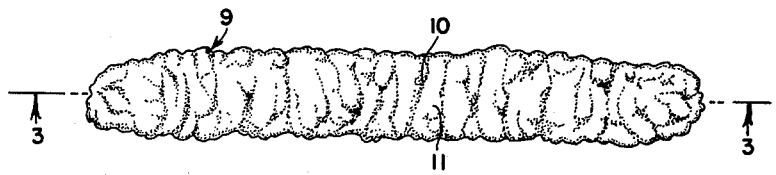
FIG. 2
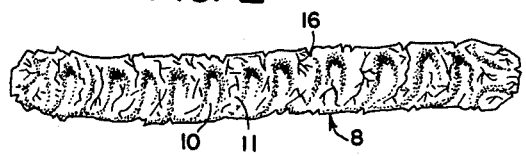
FIG. 4
FIG. 3
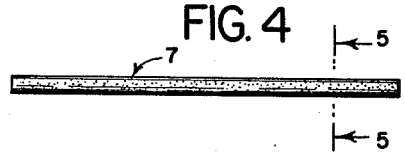
FIG. 5
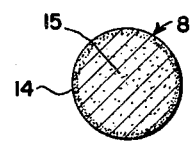
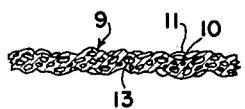
INVENTOR.
MERLE F. PEDEN, JR
BY
ATTORNEY

3,190,755
PROCESS FOR PREPARING A SNACK PRODUCT WITH A RIPPLED SURFACE

Merle F. Peden, Jr., Minneapolis, Minn., assignor to General Mills, Inc., a corporation of Delaware
Filed July 26, 1963, Ser. No. 297,892
7 Claims. (Cl. 99—81)

The present application is a continuation-in-part of my prior application Serial No. 71,589, filed November 25, 1960, now abandoned.

This invention relates to a novel snack product and to the method of preparation thereof.

It is an object of the present invention to provide a novel snack product having a rippled surface. It is another object of this invention to provide a process for the preparation of a ready-to-eat snack product having a rippled surface. Other objects will appear hereinafter.

The objects of this invention are accomplished by a process which comprises extruding a dough strand, case hardening the extruded strand, flattening the hardened strand and puffing the flattened strand. In accordance with the present invention, it was discovered that the foregoing process produced a novel snack product having a highly irregular surface and cross-section.

The invention will be better understood with reference to the attached drawings of which:

FIGURE 1 is a plane view of a snack product prepared according to the present invention;

FIGURE 2 is a plane view of a case hardened and flattened dough strand before puffing;

FIGURE 3 is an enlarged cross-sectional view of a portion of the novel snack product as taken generally along and in the direction of lines 3—3 of FIGURE 1;

FIGURE 4 is a side elevational view of a case hardened strand; and

FIGURE 5 is an enlarged, cross-sectional view of the case hardened strand as taken generally along and in the direction of lines 5—5 of FIGURE 4.

As illustrated by FIGURES 1 and 3, the snack product 9 of the present invention is characterized by its highly irregular surface and cross-section. The product 9 is typified by its highly irregular deep valleys 10 adjacent to high ridges 11 running transversely to the longitudinal axis which give the product its highly irregular cross-section as illustrated by FIGURE 3. As shown in FIGURE 3, the novel product has a porous structure made up of individual cells 13. As described hereinafter, this structure is produced by a heat treatment which has a puffing action.

The first step in preparing the present product is the extrusion of a dough strand. Preferably, the dough strand 7 is of circular cross-section. While the cross-section of the strand is not critical, at some minimum cross-section, the article is too small to be puffed satisfactorily. Thus, strands of less than one thirty-second of an inch in cross-section are not employed to produce the preferred embodiments of the present invention. Similarly, since the product is to be used as a snack product, very large pieces are not desirable, and therefore, the extruded strand is preferably less than 1 inch in diameter or cross-section. While a circular cross-section is preferred, other shapes may be used if desired. It is only necessary that the transverse dimension be sufficient to allow flattening. When a substantially solid circular dough strand is employed, it preferably has a diameter of approximately ⅛ inch. Tubular dough strands can also be employed and they preferably have an outside diameter of approximately 5/16 inch and an inside diameter of approximately 3/16 inch. Thus the preferred tubular dough strands have walls approximately 1/16 inch in thickness. Such tubular strands after case hardening, flattening and puffing yield rippled snack products in accordance with this invention which have even deeper valleys and higher ridges than those prepared from solid dough strands. As indicated, the thickness of the walls can vary considerably with the preferred thickness being about 1/16 inch.

Generally, edible puffing doughs of the prior art are useful in the process of the present invention. Thus, the dough may be an oat dough, corn dough or wheat dough, for example. Preferably, the dough is partially cooked prior to extrusion, or prepared from pregelatinized material. Preferred dough compositions and methods for the preparation thereof are illustrated in the examples to follow.

The second step in preparing the novel product 9 of the present invention is the case hardening of the strand 7. The term "case hardening" as used herein refers to hardening of material at or near the surface. The structure of a case hardened solid dough strand is illustrated in FIGURES 4 and 5. FIGURE 5 is an enlarged cross-section of such case hardened strand 7 illustrated in FIGURE 4. The material 14, which is at the surface of the strand 7, is hard and brittle while the dough 15 near the center of the strand remains essentially as it was when extruded. The hardened material near the surface of the strand 7 is obtained by drying or crystallizing the dough near the surface of the strand. Generally, this process step may be performed by any of the several methods known in the art. The only requirement appears to be that the outside of the strand becomes brittle while the inside of the strand is soft and plastic. With reference to the preferred tubular strands, the outer wall is case hardened while the inner wall remains essentially soft and plastic. This is particularly true where a long ribbon of the tubular dough strand is case hardened. Preferably, the strand 7 is case hardened by passing air over the surface of the strand. Generally, efficient hardening is obtained when air of the temperature of 20 to about 150° C. is passed over the surface for about 10 to 60 minutes. The optimum hardening conditions vary from one dough to another, and thus are best determined by trial. The strands can also be hardened by passing cold air over the surface and by freezing the strands. Therefore freezing temperatures to about 150° F. are preferred for the case hardening step.

The strand is then flattened into a ribbon 8 by any convenient method. Preferably, the strand is flattened at about room temperature by passing the case hardened strand 7 through rollers spaced closer than the diameter of the ribbon. The flattened material 8 is illustrated in FIGURE 2 of the drawings. The flattening of the strand into the ribbon causes its surface area to increase, and thereby shatters the case hardened material, leaving a fissured surface 16. The fissured surface 16 is very essential to the present invention. Preferably, the transverse dimension of the strand is reduced from one to five times during the flattening operation. The optimum reduction is greatly dependent upon the thickness and shape of the starting strand. Generally, larger strands are advantageously subjected to greater cross-section reduction. Preferably, the flattened ribbon 8 has a thickness of 0.020 to 0.100 inch.

The last of the essential steps in the present process is puffing the ribbon. Generally, prior art processes for effecting this result are useful in the present invention. The most preferred method is deep fat frying. Frying times of 5 to 60 seconds at 175 to 235 degrees centigrade have been found to be useful. Puffing by means of the sudden release of pressure is a useful and operable embodiment of the present invention. This type of puffing, however, does not produce a snack product with as unusual an appearance as the deep fat frying method.

The novel product 9 of the present invention has an unusually irregular surface and cross-section as illustrated in FIGURES 1 and 3. In contrast, if an unhardened strand is flattened and fried, a product is obtained which has a virtually constant cross-section, and only minor surface irregularities. The contrast in the appetizing appearance and texture of such a product and that of the present invention, is most striking. This profound difference is believed to be entirely attributable to the irregular shape of the present product which gives the present product a crunchy, tasty appearance.

If desired, salts, seasonings and other flavorings may be added to the present product during the various stages of the process. Many of such additives, such as salt, are most advantageously added as a final step in the process.

Optionally, the fissured ribbons may be tempered, that is, allowed to reach moisture equilibrium prior to frying. This process can usually be accomplished in a few hours in a closed container.

As is well known in the art, the effect of a puffing operation is dependent upon the moisture content of the product. For the present product it is preferred to reduce the moisture content to 5 to 15%, by weight, based on the total composition. The optimum moisture content also depends on the puffing method, the puffing conditions, the type of dough employed, etc., and is therefore best determined by trial. It is preferable to follow the moisture reducing treatment, if one is employed, by the tempering step described above.

The invention will be better understood with reference to the following examples. Unless otherwise indicated, all parts and percentages used herein are by weight.

Example I

A dough was prepared which consisted of 70 parts corn flour, 15 parts potato flour, 6 parts sugar, 3 parts salt, 5 parts wheat starch and 44 parts water. After cooking the dough for 60 minutes, using 10 p.s.i.g. steam, the cooked dough was extruded through a die to form 1/8 inch diameter strands. The strands were case-hardened by blowing 95° C. air over their surface for 25 minutes. The case hardened strands were passed between rollers spaced 0.060 inch apart, thereby flattening the strands and causing the hardened outer surface of the strand to shatter. This shattered material was pressed into the softer dough and thereby retained on the surface of the flattened strand. After drying the ribbons to approximately 10% moisture, the dried ribbons were allowed to temper overnight in closed container. The tempered ribbons were then fried for 25 seconds in deep fat at 198° C. The fried product, which was salted with 1.5% sodium chloride, had a delicious flavor. The product had a pleasant aroma and an appetizing appearance. The crispy, crunchy texture of the product also added greatly to its palatability.

Example II

Example I was repeated except that the dough was extruded in the form of a tube having an outside diameter of 5/16 inch and an inside diameter of 3/16 inch. There was obtained a rippled snack product having higher ridges and deeper valleys than the delectable product of Example I. Said product also had a more tender texture.

The foregoing examples have been included as illustrations of preferred embodiments of the present invention and are not to be interpreted as limitations on the scope thereof.

Now therefore, I claim:

1. The process of preparing an edible snack product having a rippled surface comprising extruding an extrudable dough into a strand 1/32 to 1 inch in diameter, case hardening the extruded strand until the outside thereof becomes brittle while the inside thereof remains soft and plastic, flattening the case hardened strand, and puffing the flattened strand to produce the rippled surface snack product.

2. The process of claim 1 wherein the dough is extruded into a solid strand.

3. The process of claim 1 wherein the dough is extruded into a tubular strand.

4. The process of claim 1 wherein the hardened strand is tempered prior to puffing.

5. The process of claim 1 wherein the flattened strand is puffed by deep fat frying.

6. The process of claim 1 wherein the case hardened strand is flattened to a thickness of 0.020 to 0.100 inch.

7. The process of preparing an edible snack product having a rippled surface comprising extruding an extrudable dough into a strand 1/32 to 1 inch in diameter, case hardening the extruded strand at temperatures in the range of freezing temperatures to 150° F., flattening the case hardened strand to a thickness of 1/2 to 1/5 of the transverse dimension thereof, and puffing the flattened strand, said flattened strand having a moisture content of 5 to 15% by weight prior to the puffing operation.

References Cited by the Examiner
UNITED STATES PATENTS

| | | | |
|---|---|---|---|
| 2,863,770 | 12/58 | Spieser | 99—1 |
| 2,882,162 | 4/59 | Holahan | 99—80 |
| 3,076,711 | 2/63 | Gerkens | 99—207 X |

A. LOUIS MONACELL, *Primary Examiner.*

RAYMOND N. JONES, *Examiner.*